3,260,672
SYNTHETIC ESTER LUBRICATING OIL CONTAINING CERTAIN HALOALKYL CARBOXYLIC ACID ESTERS

Alexander C. B. MacPhail, Francis H. Waight, and Derek Southern, Wirral, England, assignors to Shell Oil Company, New York, N.Y., a corporation of Delaware
No Drawing. Filed Apr. 15, 1965, Ser. No. 448,255
Claims priority, application Great Britain, Apr. 27, 1964, 17,305/64
6 Claims. (Cl. 252—54.6)

This invention relates to certain carboxylic acid esters of haloalkyl substituted alcohols which are useful as extreme-pressure agents in synthetic lubricants.

In recent years synthetic lubricants have gained in importance in the field of lubrication because they can be tailored to meet the stringent requirements of new applications. These oils are frequently subjected to operating conditions of extreme wear and high temperatures where conventional mineral oils are not satisfactory.

Under these extreme conditions, synthetic oils, which are often esters, are corrosive and undergo thermal and oxidative degradation, resulting in sludge and deposit formation, and other undesirable changes. Compounds added to enhance certain properties of the oil, such as those added to increase load-bearing capacity, often contribute to sludge formation under the extreme conditions. Therefore, the availability of additives which, in addition to performing their desired function, are compatible with other additives and do not contribute to sludging at high temperatures is very desirable.

It has now been found that certain carboxylic acid esters of haloalkyl substituted alcohols are very suitable as extreme-pressure agents when added in small quantities to synthetic lubricating base oils. These compounds improve the extreme-pressure properties of these oils to an extent greater than known additives having similar properties used for the same purpose and additionally have desirable properties of cleanliness and stability. The additives of the invention have the formula

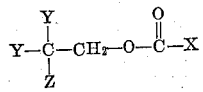

wherein X is selected from the group consisting of $C_1$ to $C_{12}$, preferably $C_2$ to $C_8$, primary to tertiary alkyl and

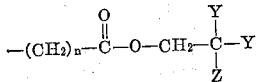

Y is mono- to trihalomethyl, Z is selected from the group consisting of methyl, ethyl, and mono- to trihalomethyl, and $n$ is an integer from 3 to 12. The halogen substituents are preferably chlorine and/or bromine, especially chlorine. These compounds are used in minor amounts effective to impart increased load-carrying ability to the oil; in general, amounts of 0.1 to 10%, preferably 1% to 6%, especially 2% to 6% by weight of the final composition are appropriate.

Examples of these haloalkyl carboxylic acid esters are di(2,2-bis-chloromethyl-3-chloropropyl)azelate, 2,2-bis(chloromethyl)-3-chloropropyl n-octoate, 2,2-bis(chloromethyl)-3-chloropropyl pivalate, 2,2-bis(chloromethyl)-3-chloropropyl hexoate and di-(2,2-bis (chloromethyl)-3-chloropropyl)sebacate.

The haloalkyl carboxylic acid esters used in the compositions of the invention may be prepared by any appropriate process. They are most conveniently prepared by reacting a haloalkyl oxetane with hydrogen chloride and treating the resulting alcohol with an appropriate carboxylic acid under esterification conditions. Suitable carboxylic acid from which esters of the invention are partially derived are aliphatic mono- to dicarboxylic acids having from 3 to about 14 carbon atoms. Examples of such acids are hexanoic, n-heptanoic, azelaic, sebacic and pivalic acids.

The effectiveness of the compounds of the invention as extreme pressure additives to synthetic ester lubricants was illustrated by means of several experiments, summarized in Table I and II. Complete lubricant formulations having the compositions shown in Table I were developed. Compositions of the invention, represented by Examples IV to VII, were tested and compared against the base oil used in all of the compositions, represented by Example I, and similar compositions containing the same amounts of known extreme-pressure additive, shown in Examples II and III. The compositions of Table I were tested for their load-carrying capacity and Institute of Automotive Engineers (IAE) yield rate as described in the Institute of Petroleum Method 166/60T, using BSS–EN34 steel gears and operating at an oil temperature of either 60° C. or 110° C. The mean failure loads at 2000 and 6000 r.p.m. at both temperatures were determined and are recorded in Table II.

TABLE I

| Composition of Example, percent wt. | I | II | III | IV | V | VI | VII |
|---|---|---|---|---|---|---|---|
| Di-iso octyl sebacate | 100.0 | 93.98 | 91.98 | 93.98 | 91.98 | 93.98 | 91.98 |
| Aroclor 1254 [1] | | 3.0 | 5.0 | | | | |
| 2,2-bis(chloromethyl)-3-chloro propyl pivalate | | | | 3.0 | 5.0 | | |
| Di(2,2-bis(chloromethyl)-3-chloropropyl)azelate | | | | | | 3.0 | 5.0 |
| 3,7-dioctyl phenothiazine | 1.5 | 1.5 | 1.5 | 1.5 | 1.5 | 1.5 | 1.5 |
| Phenyl-α-naphthylamine | 1.5 | 1.5 | 1.5 | 1.5 | 1.5 | 1.5 | 1.5 |
| 3-amino-5-anilido-1,2,4-triazole, p.p.m. | 25 | 25 | 25 | 25 | 25 | 25 | 25 |
| Azelaic acid | 0.02 | 0.02 | 0.02 | 0.02 | 0.02 | 0.02 | 0.02 |
| Silicone MS 200/12500, p.p.m. | 5 | 5 | 5 | 5 | 5 | 5 | 5 |

[1] Aroclor 1254 is a chlorinated diphenyl.

TABLE II

| | °C. | I | II | III | IV | V | VI | VII |
|---|---|---|---|---|---|---|---|---|
| IAE Scuffing, 2,000 r.p.m. | 60 | 56 | 83 | 95 | 90 | 100 | 87 | 90 |
| | 110 | 56 | 74 | 80 | 78 | 85 | 75 | 80 |
| Load (lbs.), 6,000 r.p.m. | 60 | 34 | 40 | 45 | 46 | 55 | 43 | 50 |
| | 110 | 23 | 32 | 36 | 38 | 45 | 35 | 40 |
| Sum of scuffing load (lbs.) | | 169 | 229 | 256 | 252 | 285 | 240 | 260 |

These examples show that compositions according to the present invention have superior load-carrying capabilities to similar compositions containing identical amounts of commercial extreme-pressure additives.

The following example is an illustration of the method used in preparing the haloalkyl esters for use as extreme-pressure additive in the composition of the invention.

*Preparation of di(2,2-bis(chloromethyl)-3-chloropropyl) azelate*

3,3-bis(chloromethyl)oxetane (989 g., 6.38 moles) was placed in a 2-liter, 3-necked flask fitted with a thermometer, a condenser with a bubbler tube, and a gas-inlet tube which reached to the bottom of the flask. The oxetane was melted and hydrogen chloride gas was bubbled through the liquid for a period of two hours. The reaction temperature slowly increased and reached a maximum of 100° C. The product was washed with dilute sodium carbonate solution and with water until neutral.

The crude material was fractionally distilled, under water-pump vacuum, to give 2,2-bis(chloromethyl)-3-chloropropanol (489 g., 2.53 moles) which had the following properties:

Boiling range _____ 130–133° C. at 12 mm. Hg pressure.
Melting point _____ 62° C. (theory 63–65° C.)

The following reagents were placed in a 500-ml. 3-necked flask fitted with a stirrer, thermometer and water-trap: 166 g. (0.87 mole) of the prepared 2,2-bis(chloromethyl)-3-chloropropanol, 75 g. (0.40 mole) of azelaic acid, p-toluene sulfonic acid monohydrate (4 g.) and 50 ml. of xylene. The mixture was refluxed at a pot temperature of 200° C. for 1¼ hours, by which time 15 ml. of water (of a theoretical 15.6 ml.) had collected in the trap. The dark brown reaction mixture was washed successively with water, dilute $Na_2CO_3$ solution and water again until neutral and then distilled to remove the solvent. 200 ml. of chloroform was added to the product and the solution was slurried with Davison 923 silica gel (activated at 120° C.) to remove hydroxy compound and color. The gel was removed by filtration and the filtrate was slurried with Amberlite IRA-400 ion exchange resin (activated by washing with sodium hydroxide solution). After filtering and distilling to remove solvent, the liquid product, di(2,2-bis(chloromethyl)-3-chloropropyl)azelate (130 g., 61% yield) had the following analysis:

Acid value _____ Nil.
Free chloride _____ Nil.
Chlorine _____ Found: 39.4% wt. $C_{19}H_{30}Cl_6O_4$ requires 39.9% wt. Cl.
Saponification value
 (corrected for chloride) _____ Found: 213 mg. KOH/g.
  Theory: 210 mg. KOH/g.

Preferred synthetic lubricant base stocks for use in compositions of the invention are esters of alcohols having 1 to 20, especially 4 to 12, carbon atoms and aliphatic carboxylic acids having from 3 to 20, especially 4 to 12, carbon atoms. The ester base may be a simple ester (reaction product of a monohydroxy alcohol and a monocarboxylic acid), a polyester (reaction product of an alcohol and an acid, one of which has more than one functional group), or a complex ester (reaction product of a polyfunctional acid with more than one alcohol, or of a polyfunctional alcohol with more than one acid). Also, excellent synthetic lubricants may be formulated from mixtures of esters, such as major proportions of complex esters and minor amounts of diesters.

These ester oils may be prepared by simple reaction of the alcoholic and acidic reactants in amounts suitable for producing the desired product. Preparation preferably is effected in a solid, such as an aromatic hydrocarbon, in the presence of a catalyst, such as HCl, HF, $H_2SO_4$, $H_3PO_4$, etc.

Particularly suitable ester-based stocks are esters of dibasic acids with monohydric alcohols such as di(2-ethylhexyl)azelate, di(1,3-methylbutyl)adipate, di(2-ethylhexyl)sebacate, and bis(2,2,4-trimethylpentyl)azelate. Particularly preferred esters for use as base stocks in the invention are esters of monocarboxylic acids having 3 to 12 carbons and polyalcohols having 4 to 8 carbons, such as pentaerythritol, dipentaerythritol and trimethylolpropane. Examples of these compounds are pentaerythrityl tetracaproate, pentaerythrityl dibutyratedivalerate, and dipentaerythrityl hexaheptoate. Esters of pentaerythritol and dipentaerythritol with mixtures of $C_4$ to $C_{12}$ acids are excellent base oils and are commercially available from Hercules Chemical Company.

The lubricating oil compositions of the invention may also contain only known additives to improve other properties of the formulation, for example, thickeners, antioxidants, and anti-lacquering agents, anti-foaming agents, dyes, anti-corrosion agents, and metal deactivators. Suitable antioxidants are alkylated phenols such as 2,6-ditertiarybutyl-4-methyl phenol and arylamines such as phenyl-alpha-naphthylamine, diphenylamine, 2,2-pyridylamine, and para,para-dioctyldiphenylamine. Mixtures of antioxidants may also be used. Suitable antifoam agents are polydimethylsiloxanes having viscosities from 100 to 100,000 cs. at 25° C. Examples of anticorrosion agents and metal deactivators are triazoles and their derivatives and low-molecular-weight dicarboxylic acids, such as azelaic acid and sebacic acid.

We claim as our invention:

1. A synthetic lubricating oil comprising a major amount of a synthetic ester lubricating oil and a minor amount sufficient to enhance the load-carrying capacity of the oil of a haloalkyl carboxylic acid ester having the formula

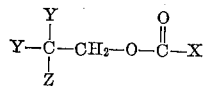

wherein X is selected from the group consisting of $C_1$ to $C_{12}$ primary to tertiary alkyl radicals and

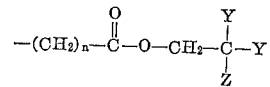

Y is mono- to trihalomethyl, Z is selected from the group consisting of methyl, ethyl, and mono- to trihalomethyl, halogen substituents are selected from chlorine and bromine, and n is an integer from 3 to 12.

2. The lubricant of claim 1 wherein all halogen substituents are chlorine.

3. The lubricant of claim 1 wherein the haloalkyl carboxylic acid ester is present in the amount of from 1% to 6% by weight of the final lubricating composition.

4. A synthetic lubricating composition comprising a major amount of a synthetic ester base oil and a minor amount effective to increase the load-carrying capacity of the oil 2,2-bis(chloromethyl)-3-chloropropyl pivalate.

5. A synthetic lubricating composition comprising a major amount of a synthetic ester base oil and a minor amount effective to increase the load-carrying capacity of the oil of di(2,2-bis(chloromethyl)-3-chloropropyl) azelate.

6. A synthetic lubricating composition comprising a major amount of a synthetic ester base oil and a minor amount effective to increase the load-carrying capacity of the oil of di(2,2-bis(chloromethyl)-3-chloropropyl) sebacate.

References Cited by the Examiner

UNITED STATES PATENTS

| | | | |
|---|---|---|---|
| 2,667,505 | 1/1954 | Ladd et al. | 252—54.6 X |
| 2,710,877 | 6/1955 | Young et al. | 252—54 X |
| 2,959,552 | 11/1960 | Peras | 252—54.6 |
| 3,081,342 | 3/1963 | Nooy | 252—54.6 |

OTHER REFERENCES

Chemical Abstracts, vol. 56 (1962), page 1673, Reith et al.

DANIEL E. WYMAN, *Primary Examiner.*

W. H. CANNON, *Assistant Examiner.*